(12) United States Patent
Christianson et al.

(10) Patent No.: US 12,017,748 B2
(45) Date of Patent: Jun. 25, 2024

(54) FUSELAGE BARREL ASSEMBLIES AND METHODS OF ASSEMBLING FUSELAGE BARREL ASSEMBLIES

(71) Applicant: The Boeing Company, Chicago, IL (US)

(72) Inventors: Keith A. Christianson, Everett, WA (US); Brent Edward Beneke, Mukilteo, WA (US); Soo H. Teoh, Mill Creek, WA (US); Drew-Daniel Keefe, Maple Valley, WA (US); Kyle Edward Lyon, Seattle, WA (US); Andrew Joseph Gubel, Seattle, WA (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 17/680,810

(22) Filed: Feb. 25, 2022

(65) Prior Publication Data

US 2022/0297817 A1  Sep. 22, 2022

Related U.S. Application Data

(60) Provisional application No. 63/162,341, filed on Mar. 17, 2021.

(51) Int. Cl.
 *B64C 1/06* (2006.01)
 *B64C 25/04* (2006.01)
 *B64F 5/10* (2017.01)

(52) U.S. Cl.
 CPC .............. *B64C 1/064* (2013.01); *B64C 1/069* (2013.01); *B64C 25/04* (2013.01); *B64F 5/10* (2017.01)

(58) Field of Classification Search
 CPC .............................. B64C 1/069; B64C 1/064
 See application file for complete search history.

(56) References Cited

U.S. PATENT DOCUMENTS 8,302,909 B2 * 11/2012 Cazeneuve ............. B64C 1/069
                                                     244/119
8,740,151 B1   6/2014 Rosman et al.
(Continued)

FOREIGN PATENT DOCUMENTS

BR  102013032347 A2 * 12/2015
CN    102046358 A  *  5/2011  ............. B64C 1/064
(Continued)

OTHER PUBLICATIONS

European Patent Office, Extended European Search Report for related application No. 22 16 1795, issued Jul. 29, 2022.

*Primary Examiner* — Richard Green
*Assistant Examiner* — Anna L Gordon
(74) *Attorney, Agent, or Firm* — Kolitch Romano Dascenzo Gates LLC

(57) ABSTRACT

Fuselage barrel assemblies and methods of assembling fuselage barrel assemblies are disclosed herein. The fuselage barrel assemblies include a first barrel section and a second barrel section, which is interfaced with the first barrel section to define a barrel joint between the first barrel section and the second barrel section. The fuselage barrel assemblies also include a split longeron, which extends across the barrel joint and is attached to both the first barrel section and the second barrel section. The split longeron includes a first longeron section, which is attached to the first barrel section, and a second longeron section, which is attached to the second barrel section. The split longeron also includes a longeron joint that attaches the first longeron section to the second longeron section. The methods include methods of assembling the fuselage barrel assemblies.

20 Claims, 12 Drawing Sheets

(56) References Cited

U.S. PATENT DOCUMENTS

| | | | |
|---|---|---|---|
| 9,187,167 B2* | 11/2015 | Sauermann | B29C 66/7212 |
| 10,150,553 B2* | 12/2018 | Cacciaguerra | B64C 1/069 |
| 2010/0320321 A1 | 12/2010 | Sauermann | |
| 2016/0375979 A1* | 12/2016 | Von-Wilmowsky | B64C 25/20 |
| | | | 244/17.17 |
| 2020/0189714 A1* | 6/2020 | Murphy | B64C 1/26 |

FOREIGN PATENT DOCUMENTS

| | | | |
|---|---|---|---|
| EP | 2781450 A1 | 9/2014 | |
| EP | 2799220 A1 * | 11/2014 | B29D 99/0007 |
| EP | 3028940 A1 * | 6/2016 | B64C 1/061 |
| EP | 3028940 A1 | 6/2016 | |
| WO | WO-2009065587 A1 * | 5/2009 | B64C 1/061 |

\* cited by examiner

FUSELAGE BARREL ASSEMBLIES AND METHODS OF ASSEMBLING FUSELAGE BARREL ASSEMBLIES

RELATED APPLICATION

The present application claims priority to U.S. Provisional Patent Application No. 63/162,341, filed on Mar. 17, 2021, entitled "FUSELAGE BARREL ASSEMBLIES AND METHODS OF ASSEMBLING FUSELAGE BARREL ASSEMBLIES," the complete disclosure of which is incorporated by reference.

FIELD

The present disclosure relates generally to fuselage barrel assemblies and to methods of assembling fuselage barrel assemblies and more particularly to fuselage barrel assemblies and methods that utilize a split longeron.

BACKGROUND

During manufacturing of an aircraft, a fuselage barrel assembly may be assembled from a plurality of barrel sections. In certain regions of the fuselage barrel assembly, a longeron may extend between, may interconnect, may provide structural support for two adjacent barrel sections, and/or may reinforce a joint between the two adjacent barrel sections. Such longerons conventionally have been single-piece structures. While effective, installation of such single-piece longerons may be time consuming and/or may require that additional assembly steps be performed subsequent to installation of the single-piece longerons within the fuselage barrel assembly. This adds to the overall time and cost associated with an already cost and space-intensive step of the manufacturing process. Thus, there exists a need for improved fuselage barrel assemblies and/or for improved methods of assembling the improved fuselage barrel assemblies.

SUMMARY

Fuselage barrel assemblies and methods of assembling fuselage barrel assemblies are disclosed herein. The fuselage barrel assemblies include a first barrel section and a second barrel section, which is interfaced with the first barrel section to define a barrel joint between the first barrel section and the second barrel section. The fuselage barrel assemblies also include a split longeron, which extends across the barrel joint and is attached to both the first barrel section and the second barrel section. The split longeron includes a first longeron section, which is attached to the first barrel section via a first plurality of section fasteners, and a second longeron section, which is attached to the second barrel section via a second plurality of section fasteners. The split longeron also includes a longeron joint that attaches the first longeron section to the second longeron section via a plurality of joint fasteners.

The methods include attaching a first longeron section to a first barrel section of a fuselage barrel assembly utilizing a first plurality of section fasteners. The methods also include assembling the first barrel section and a second barrel section to define a barrel joint between the first barrel section and the second barrel section. The methods further include attaching a second longeron section to the second barrel section utilizing a second plurality of section fasteners and attaching the first longeron section to the second longeron section utilizing a plurality of joint fasteners.

DESCRIPTION

Figure 1:
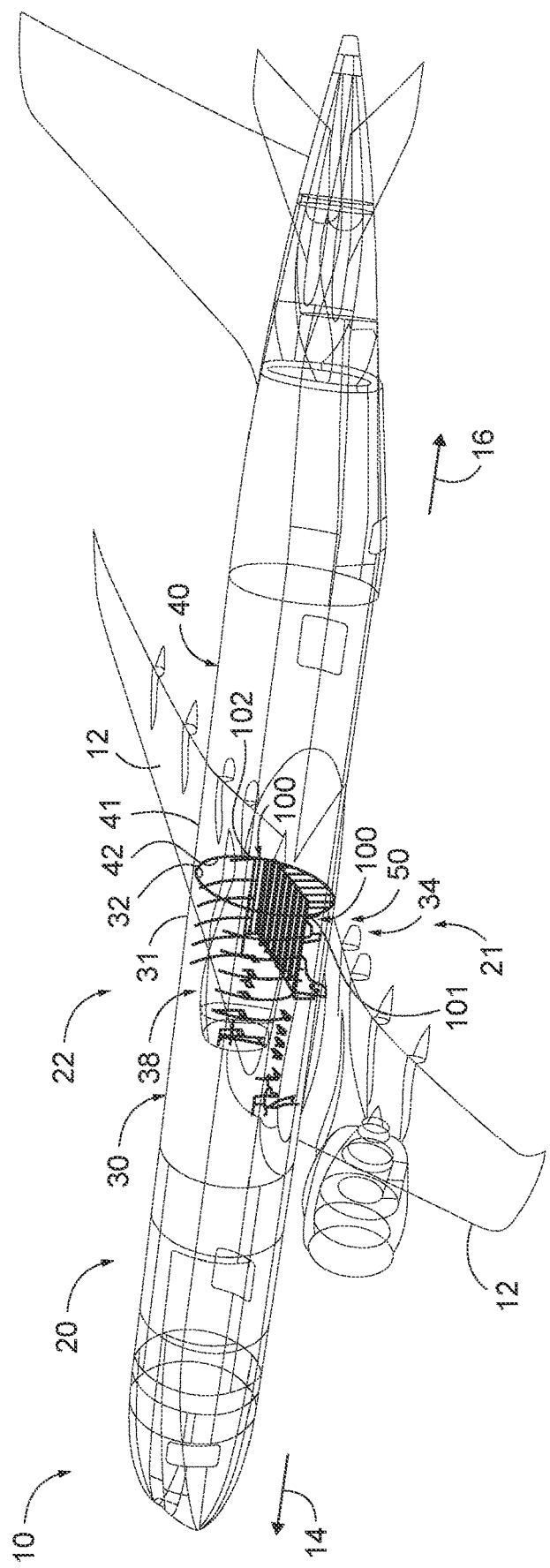
FIG. 1 is a schematic illustration of an example of an aircraft that includes a fuselage barrel assembly, according to the present disclosure.

FIGS. 1-17 provide illustrative, non-exclusive examples of aircraft 10, fuselage barrel assemblies 20, split longerons 100, and/or methods 200, according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
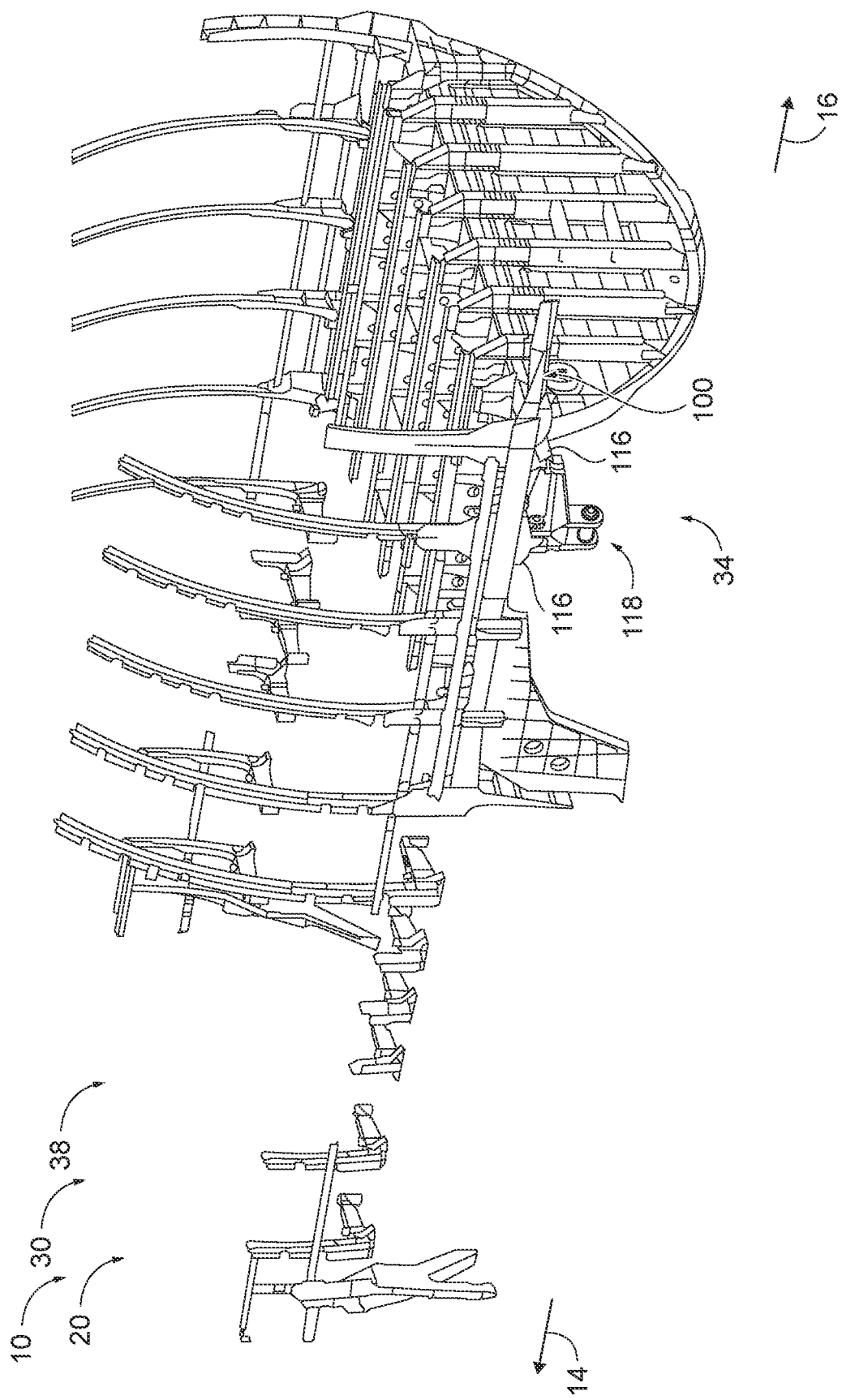
FIG. 2 is a schematic illustration of an example of a first internal frame assembly that may form a portion of the aircraft of FIG. 1.
Figure 3:
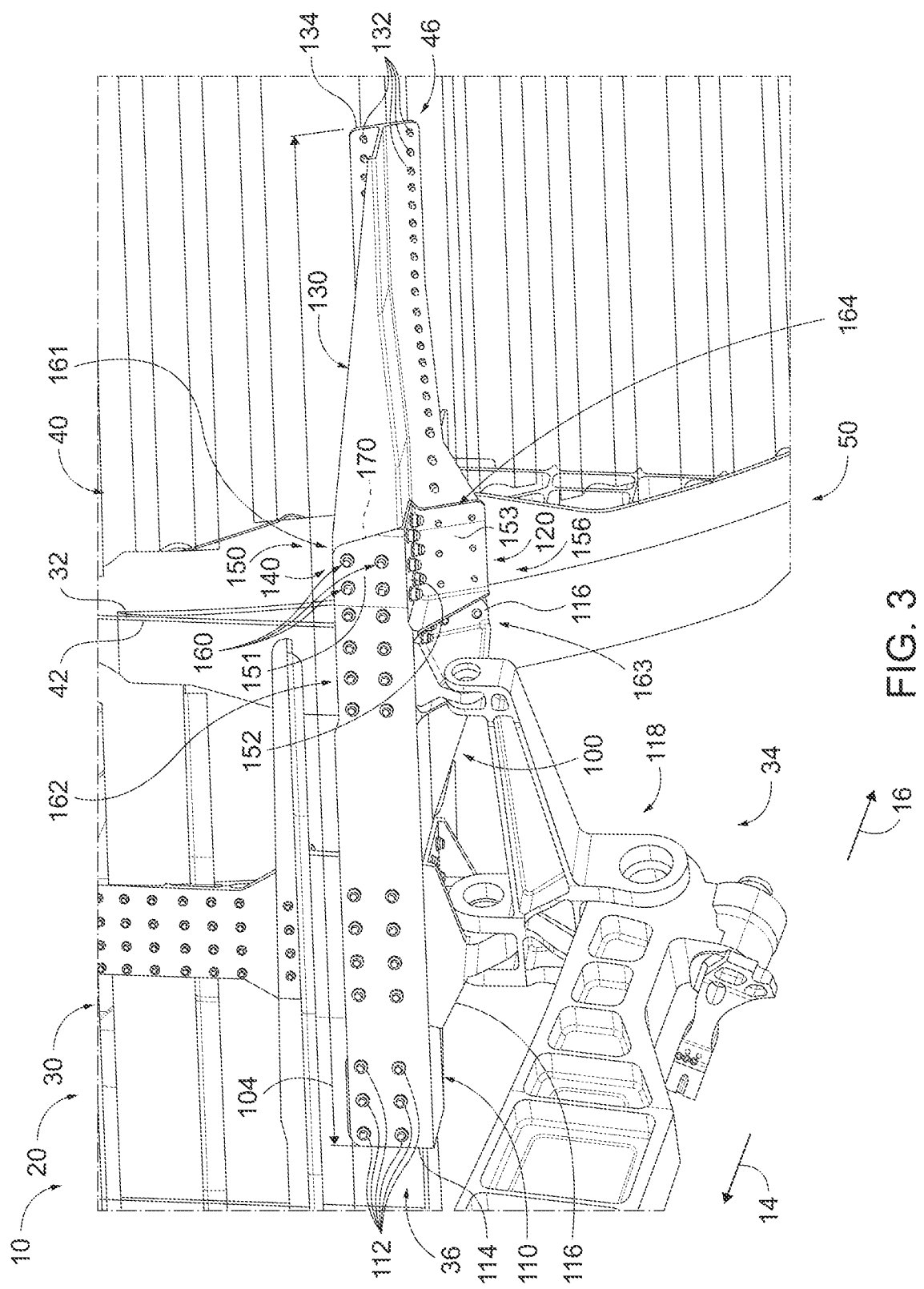
FIG. 3 is a schematic illustration of a region of the fuselage barrel assembly of FIG. 1.
Figure 4:
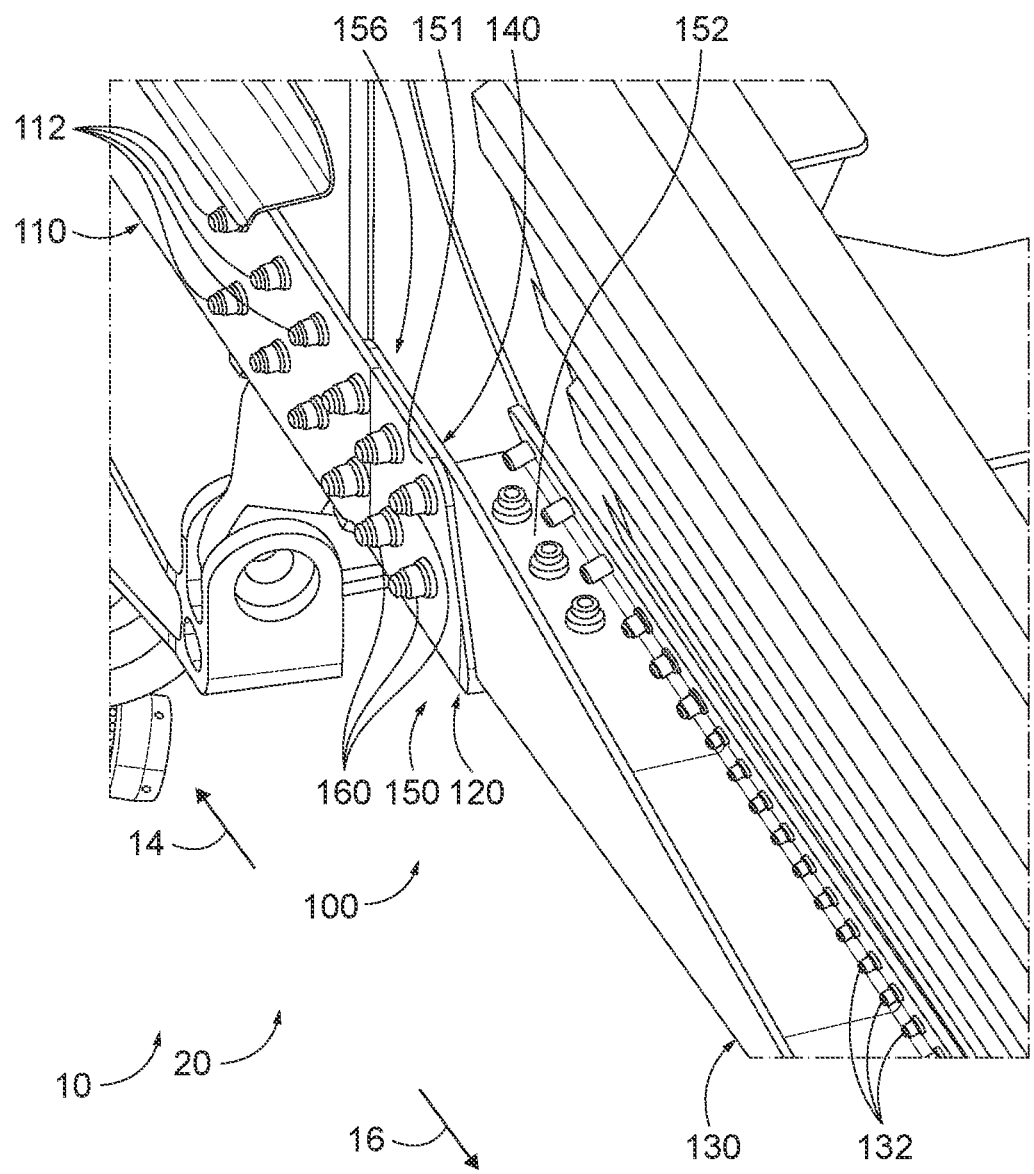
FIG. 4 is a schematic illustration of a region of the fuselage barrel assembly of FIG. 1.
Figure 5:
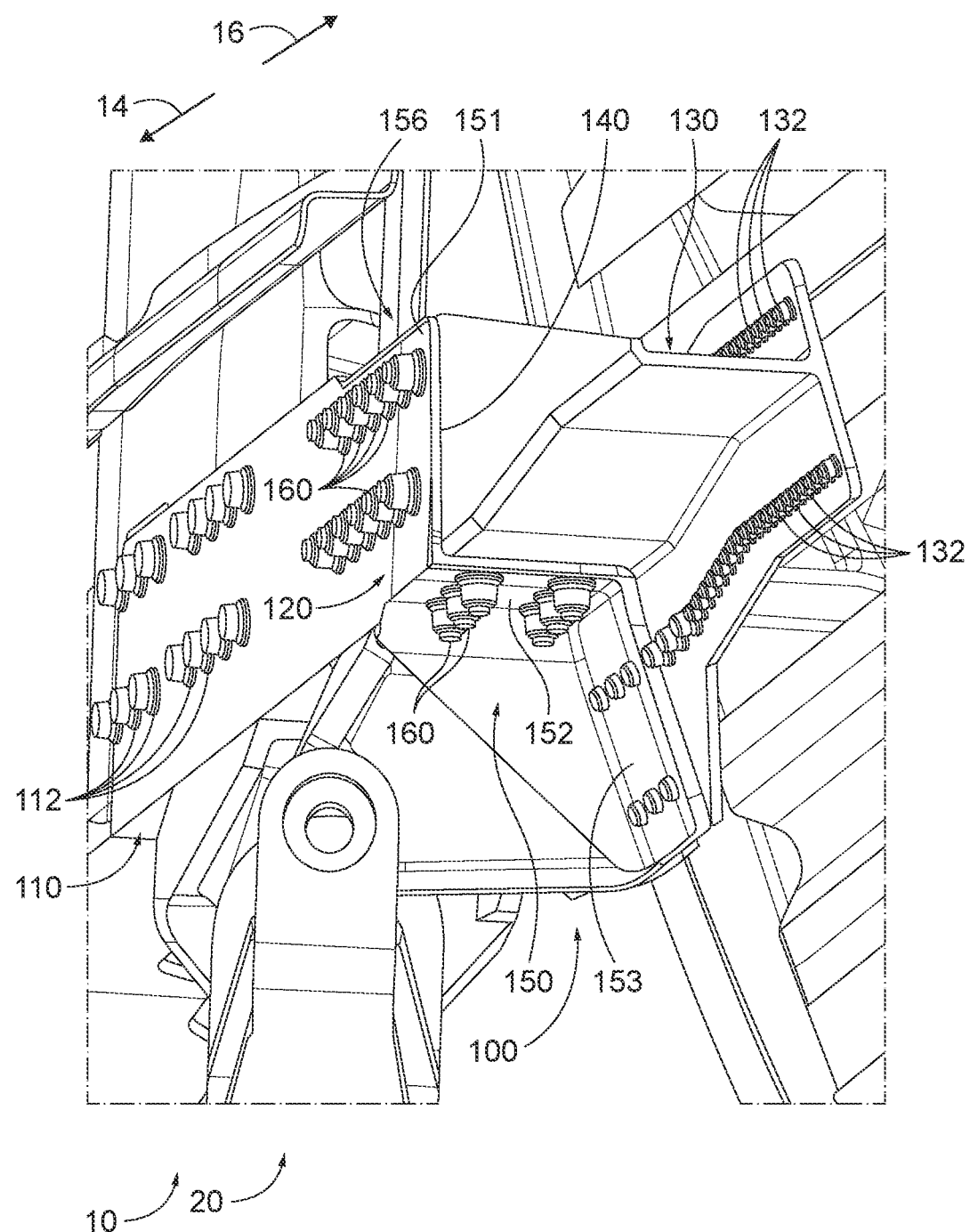
FIG. 5 is a schematic illustration of a region of the fuselage barrel assembly of FIG. 1.

FIG. 1 is a schematic illustration of an example of an aircraft 10 that includes a fuselage barrel assembly 20, according to the present disclosure. FIG. 2 is a schematic illustration of an example of a first internal frame assembly 38 that may form a portion of aircraft 10 of FIG. 1. FIGS. 3-5 are schematic illustrations of examples of regions of fuselage barrel assembly 20 of FIG. 1. FIGS. 7-15 are schematic illustrations of examples of components of a fuselage barrel assembly 20 that may be assembled utilizing the methods 200 of FIG. 6.

As collectively illustrated by FIGS. 1-5 and FIGS. 7-17, fuselage barrel assemblies 20 include a first barrel section 30 and a second barrel section 40. As perhaps best illustrated in FIGS. 1, 12, and 15, first barrel section 30 and second barrel section 40 define a barrel joint 50 therebetween.

As perhaps best illustrated in FIGS. 1-5 and 8-17, fuselage barrel assemblies 20 also include a split longeron 100. Split longeron 100 extends across barrel joint 50 and is attached to both first barrel section 30 and second barrel section 40, as perhaps best illustrated in FIGS. 1, 3, 8, 12, and 15. Split longeron 100 includes a first longeron section 110, a second longeron section 130, and a longeron joint 150.

As perhaps best illustrated in FIGS. 3-5, first longeron section 110 is attached, or operatively attached, to first barrel section 30 via a first plurality of section fasteners 112. Similarly, second longeron section 130 is attached, or operatively attached, to second barrel section 40 via a second plurality of section fasteners 132. In addition, longeron joint 150 attaches, or operatively attaches, first longeron section 110 to second longeron section 130 via a plurality of joint fasteners 160.

Split longeron 100 may include any suitable structure that includes first longeron section 110, that includes second longeron section 130, and/or that includes and/or defines longeron joint 150. Additionally or alternatively, split longeron 100 may include any suitable structure that extends across barrel joint 50 and/or that is operatively attached to both first barrel section 30 and second barrel section 40. As discussed in more detail herein with reference to methods 200, utilization of split longeron 100, which includes both first longeron section 110 and second longeron section 130, may permit and/or facilitate improved efficiency during assembly of fuselage barrel assembly 20 and/or may provide additional clearance for assembly of fuselage barrel assembly 20.

First longeron section 110 may be forward and/or may be in a forward direction 14 relative to second longeron section 130. In some examples, first longeron section 110 may include a first barrel-contacting region 114 that interfaces with, contacts, directly contacts, and/or indirectly contacts first barrel section 30, as perhaps best illustrated in FIG. 3. In some such examples, first barrel-contacting region 114 may be referred to herein as and/or may be a planar first barrel-contacting region 114 and/or an at least substantially planar first barrel-contacting region 114.

In some examples, first longeron section 110 may include and/or may be operatively attached to a landing gear fitting 116, or a plurality of landing gear fittings 116, as perhaps best illustrated in FIGS. 2-3. Landing gear fitting 116, when present, may be configured to at least partially support a landing gear assembly 118 of aircraft 10. In some such examples, landing gear assembly 118 may be attached to first longeron section 110 via landing gear fitting 116. In some such examples, first longeron section 110 may at least partially define a landing gear bay 34 of aircraft 10 and/or may at least partially bound landing gear bay 34, as illustrated in FIGS. 1-3.

As discussed in more detail herein with reference to methods 200, utilization of split longerons 100 that include first longeron section 110 may permit and/or facilitate improved efficiency during assembly of fuselage barrel assembly 20. As an example, first longeron section 110 may be operatively attached to first barrel section 30 prior to assembly of first barrel section 30 with second barrel section 40. As another example, and when first longeron section 110 includes and/or is operatively attached to a plurality of landing gear fittings 116, the plurality of landing gear fittings 116 may be line bored prior to assembly of first barrel section 30 with second barrel section 40. As yet another example, landing gear assembly 118 may be installed within landing gear bay 34 prior to assembly of first barrel section 30 with second barrel section 40.

Each of the above benefits may decrease the time required to assemble first barrel section 30 and second barrel section 40. Because fuselage barrel assembly 20 of aircraft 10 is large, assembly of fuselage barrel sections, including first barrel section 30 and second barrel section 40, is costly and requires a large amount of space within a factory that manufactures aircraft 10. As such, performing any of the above steps prior to assembly of first barrel section 30 and second barrel section 40 may provide significant cost savings within the context of the overall manufacturing process for aircraft 10.

Second longeron section 130 may be aft and/or may be in an aft direction 16 relative to first longeron section 110. In some examples, second longeron section 130 may include a second barrel-contacting region 134 that interfaces with, contacts, directly contacts, and/or indirectly contacts second barrel section 40, as perhaps best illustrated in FIG. 3. In some such examples, second barrel-contacting region 134 may be referred to herein as and/or may be a non-planar, or a curved, second barrel-contacting region 134.

Longeron joint 150 may include any suitable structure that operatively attaches first longeron section 110 to second longeron section 130, such as via plurality of joint fasteners 160. In some examples, longeron joint 150 includes and/or is a lap joint and/or an overlap joint. In some such examples, longeron joint 150 defines an overlap region 156 between first longeron section 110 and second longeron section 130, as perhaps best illustrated in FIGS. 3-5. In some such examples, first longeron section 110 may include and/or define a first overlap region 120 and second longeron section 130 may include and/or define a second overlap region 140. In some such examples, first overlap region 120 and second overlap region 140 may overlap with one another, such as along a longitudinal length 104 of split longeron 100, to define longeron joint 150.

In some examples, longeron joint 150 may define a first joint region 151, a second joint region 152, and a third joint region 153, as perhaps best illustrated in FIGS. 3-5 and 16-17. In some such examples, first longeron section 110 and second longeron section 130 overlap with one another within first joint region 151, within second joint region 152, and/or within third joint region 153. In some such examples, first joint region 151, second joint region 152, and third joint region 153 are oriented at skew angles relative to one another. In some such examples, first joint region 151 may include and/or be a planar, or at least substantially planar, first joint region 151. Additionally or alternatively, second joint region 152 may include and/or be a planar, or at least substantially planar, second joint region 152. Additionally or alternatively, third joint region 153 may include and/or be a planar, or at least substantially planar, third joint region 153.

In some such examples, first joint region 151, second joint region 152, and third joint region 153 together may define a Z-shaped splice between first longeron section 110 and second longeron section 130. Such a configuration may permit split longeron 100 to support and/or to resist compression loads, tension loads, and/or torsional loads applied perpendicular to the elongate axis of split longeron 100, and/or torsional loads applied around the elongate axis of split longeron 100.

In some examples, longeron joint 150 may be proximate barrel joint 50. As an example, a transverse cross-section of fuselage barrel assembly 20, which extends at least partially through barrel joint 50, may extend within at least a region of longeron joint 150 and/or may be within a threshold distance of longeron joint 150. Examples of the threshold distance include threshold distances of at most 0.01 meter (m), at most 0.05 m, at most 0.1 m, at most 0.2 m, at most 0.3 m, at most 0.4 m, and at most 0.5 m.

In some examples, split longerons 100 may include a joint shim 170, as illustrated in FIG. 3. Joint shim 170, when present, may extend and/or may be positioned within longeron joint 150. In some examples, joint shim 170 may be positioned and/or may be compressed between first longeron section 110 and second longeron section 130.

Inclusion of joint shim 170 within longeron joint 150 may permit and/or facilitate assembly of fuselage barrel assembly 20 without a need to include corresponding shim(s) between first barrel section 30 and first longeron section 110 and/or between second barrel section 40 and second longeron section 130. In general, longeron joint 150 may be more accessible than a region that extends between first barrel section 30 and first longeron section 110 and/or than a region that extends between second barrel section 40 and second longeron section 130. As such, fuselage barrel assemblies 20 with split longerons 100 that include longeron joint 150 that may receive joint shim 170, according to the present disclosure, may be less time-consuming to assemble when compared to conventional fuselage barrel assemblies that include single-piece longerons.

With the above in mind, fuselage barrel assembly 20 may be free of a shim that extends between first longeron section 110 and first barrel section 30. Stated another way, first longeron section 110 may be in contact, or in direct physical contact, with first barrel section 30. Additionally or alternatively, fuselage barrel assembly 20 may be free of a shim that extends between second longeron section 130 and second barrel section 40. Stated another way, second longeron section 130 may be in contact, or in direct physical contact, with second barrel section 40.

First barrel section 30 may include any suitable structure that may be interfaced with second barrel section 40 to define barrel joint 50. As examples, first barrel section may include a first skin 31, as illustrated in FIG. 1, and/or first internal frame assembly 38, as collectively illustrated by FIGS. 1-2. In some examples, first barrel section 30 may be forward, or in forward direction 14, relative to second barrel section 40. In some examples, first barrel section 30 may bound, or at least partially bound, landing gear bay 34 of aircraft 10. In some such examples, and as perhaps best illustrated in FIG. 2, first internal frame assembly 38 may bound, may at least partially bound, may support, may at least partially support, may define, and/or may at least partially define landing gear bay 34. In some examples, and as perhaps best illustrated in FIG. 1, first barrel section 30 may be attached, or operatively attached, to at least a region of a wing 12 of aircraft 10. In some examples, first barrel section 30 may define a first edge 32 that may at least partially define barrel joint 50.

In some examples, and as perhaps best illustrated in FIG. 3, first barrel section 30 may define and/or include a first longeron-contacting region 36. First longeron-contacting region 36 may be configured to interface with first longeron section 110 and/or with first barrel-contacting region 114 thereof. In some such examples, first longeron-contacting region 36 may be a planar first longeron-contacting region 36 or an at least substantially planar first longeron-contacting region 36.

Second barrel section 40 may include any suitable structure that may be interfaced with first barrel section 30 to define barrel joint 50. As examples, second barrel section 40 may include a second skin 41 as illustrated in FIG. 1. In some examples, second barrel section 40 may be aft, or in aft direction 16, relative to first barrel section 30. In some examples, second barrel section 40 may define a second edge 42 that may at least partially define barrel joint 50.

In some examples, and as perhaps best illustrated in FIG. 3, second barrel section 40 may define and/or include a second longeron-contacting region 46. Second longeron-contacting region 46 may be configured to interface with second longeron section 130 and/or with second barrel-contacting region 134 thereof. In some such examples, second longeron-contacting region 46 may be a non-planar second longeron-contacting region 46.

First plurality of section fasteners 112, which also may be referred to herein as fasteners 112, may differ from, be distinct from, and/or be spaced-apart from second plurality of section fasteners 132 and/or plurality of joint fasteners 160. Additionally or alternatively, first plurality of section fasteners 112 may be spaced-apart from second barrel section 40 and/or from second longeron section 130.

Second plurality of section fasteners 132, which also may be referred to herein as fasteners 132, may differ from, be distinct from, and/or be spaced-apart from first plurality of section fasteners 112 and/or plurality of joint fasteners 160. Additionally or alternatively, second plurality of section fasteners 132 may be spaced-apart from first barrel section 30 and/or from first longeron section 110.

At least a subset of the plurality of joint fasteners 160, which also may be referred to herein as fasteners 160, may differ from, may be distinct from, and/or may be spaced-apart from first plurality of section fasteners 112 and/or second plurality of section fasteners 132. In some examples, a first subset 161 of the plurality of joint fasteners 160 may be spaced-apart from first barrel section 30. Additionally or alternatively, a second subset 162 of the plurality of joint fasteners 160 may be spaced-apart from second barrel section 40. Additionally or alternatively, a third subset 163 of the plurality of joint fasteners 160 may attach, or operatively attach, split longeron 100 to first barrel section 30. Additionally or alternatively, a fourth subset 164 of the plurality of joint fasteners 160 may attach, or operatively attach, split longeron 100 to second barrel section 40.

Fasteners 112, fasteners 132, and/or fasteners 160 may include and/or be any suitable fastener. Examples of such fasteners include rivets, pop rivets, crush rivets, bolts, screws, nuts, and/or washers.

Turning to FIG. 1, aircraft 10 and/or fuselage barrel assembly 20 thereof may have and/or define a first side 21 and a second side 22, which may be opposed to first side 21. In some such examples, aircraft 10 and/or fuselage barrel assembly 20 thereof may include a first split longeron 101, which may be positioned on first side 21 and a second split longeron 102, which may be positioned on second side 22.

Figure 6:
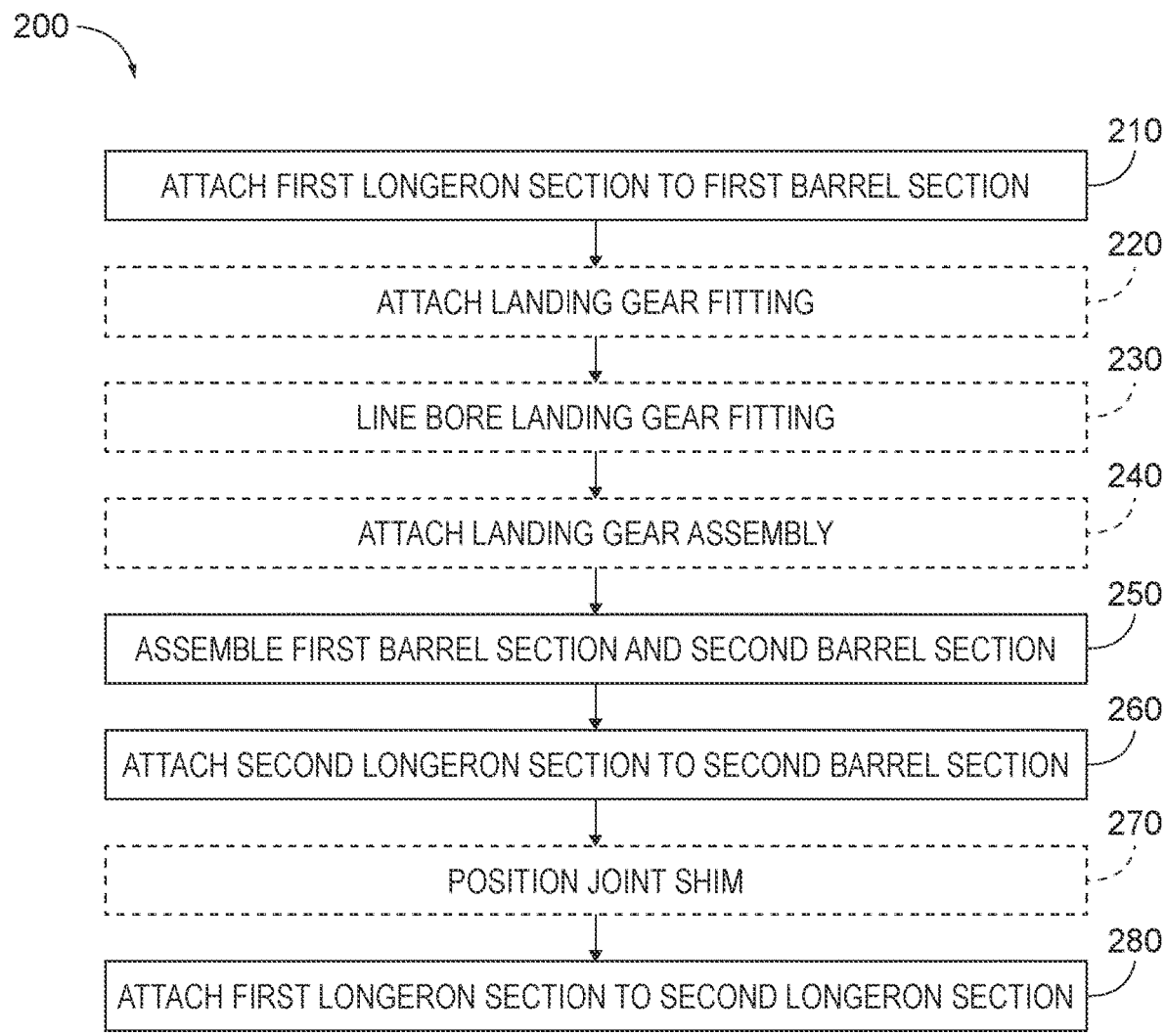
FIG. 6 is a flowchart depicting examples of methods of assembling a fuselage barrel assembly, according to the present disclosure.
Figure 7:
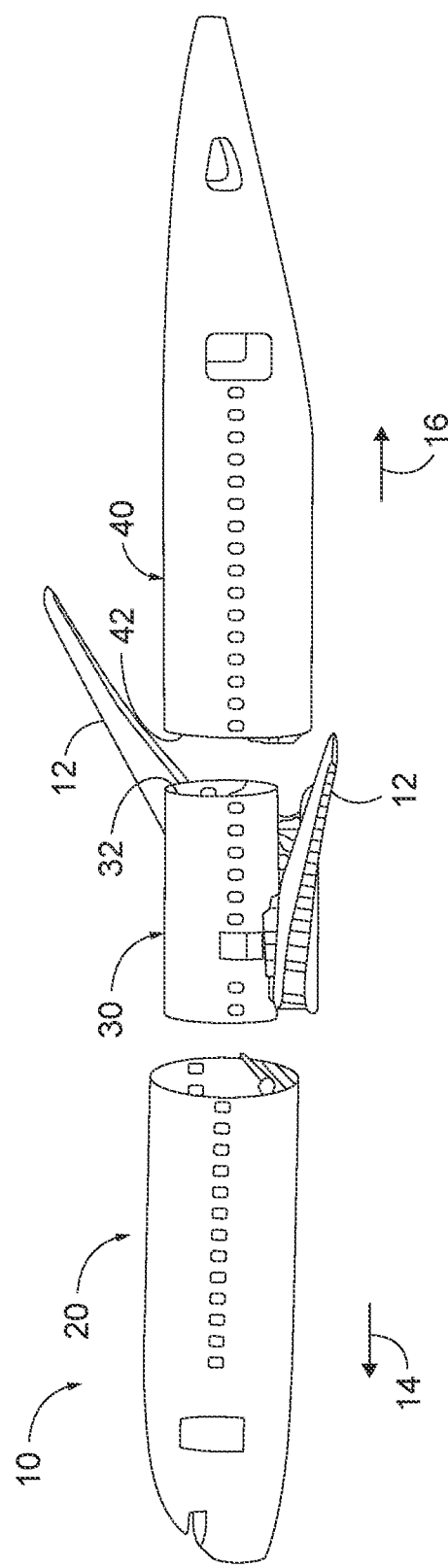
FIG. 7 is a schematic illustration of an example of components of a fuselage barrel assembly that may be assembled utilizing the methods of FIG. 6.

FIG. 6 is a flowchart depicting examples of methods 200 of assembling a fuselage barrel assembly, according to the present disclosure, such as fuselage barrel assembly 20 of FIGS. 1-5. FIGS. 7-17 illustrate regions and/or components of a fuselage barrel assembly 20 during various steps of the methods of FIG. 6, with FIG. 7 illustrating a partially assembled fuselage barrel assembly prior to performing the methods of FIG. 6.

Methods 200 include attaching a first longeron section to a first barrel section at 210 and may include attaching a landing gear fitting at 220, line boring the landing gear fitting at 230, and/or attaching a landing gear assembly at 240. Methods 200 also include assembling the first barrel section and a second barrel section at 250 and attaching a second longeron section to the second barrel section at 260. Methods 200 also may include positioning a joint shim at 270 and include attaching the first longeron section to the second longeron section at 280.

Attaching the first longeron section to the first barrel section at 210 may include attaching the first longeron section to the first barrel section with, via, and/or utilizing a first plurality of section fasteners. Examples of the first longeron section are disclosed herein with reference to first longeron section 110 of split longeron 100. Examples of the first barrel section are disclosed herein with reference to first barrel section 30 of fuselage barrel assembly 20. Examples of the first plurality of section fasteners are disclosed herein with reference to first plurality of section fasteners 112.

Figure 8:
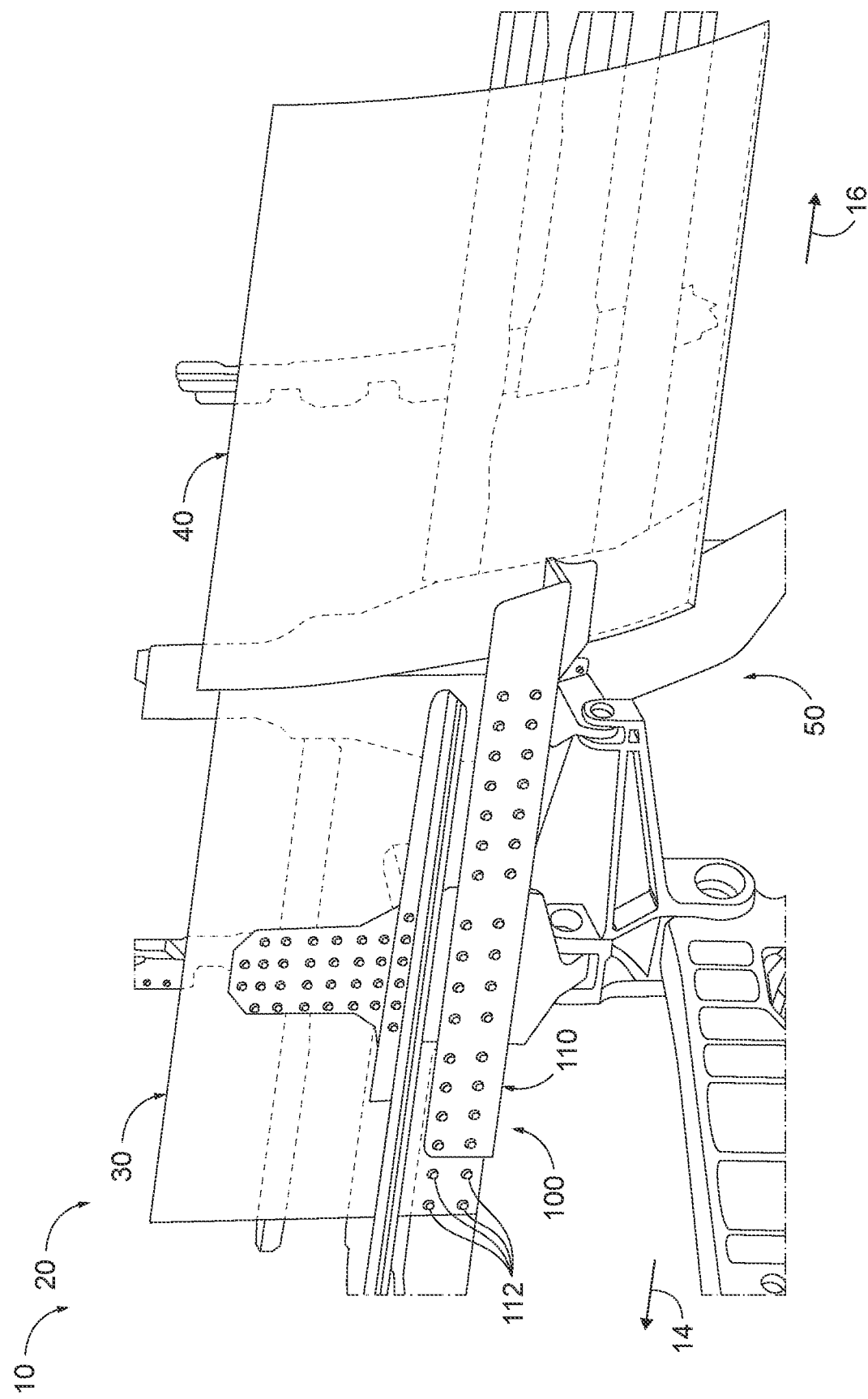
FIG. 8 is a schematic illustration of an example of a region of a fuselage barrel assembly during the methods of FIG. 6.
Figure 9:
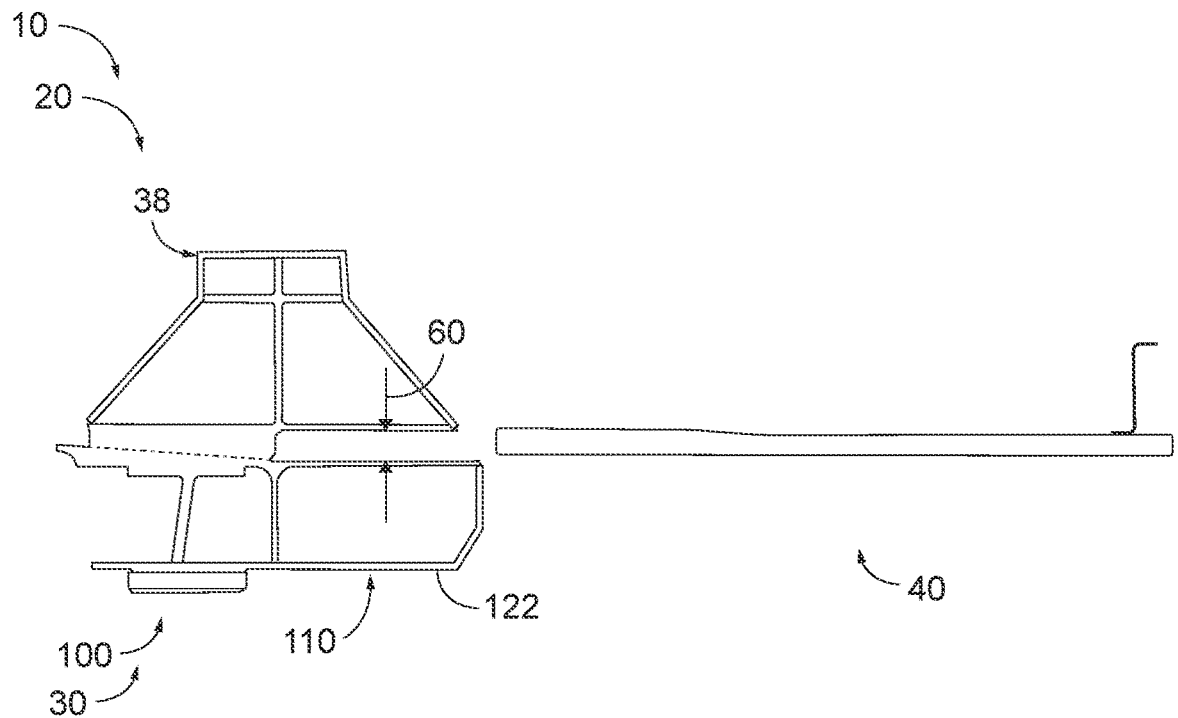
FIG. 9 is a schematic illustration of an example of a region of a fuselage barrel assembly during the methods of FIG. 6.

FIGS. 8-17 illustrate regions of a fuselage barrel assembly 20 subsequent to performing the attaching at 210. More specifically, FIGS. 8-17 illustrate first longeron section 110 attached to first barrel section 30. This attachment is via the first plurality of section fasteners 112, as illustrated in FIG. 8.

In some examples, the attaching at 210 may include extending each first fastener of the first plurality of section fasteners through a corresponding first fastener hole, which extends through both the first longeron section and the first barrel section. In some such examples, the attaching at 210 includes urging a corresponding first region of the first longeron section and the first barrel section toward one another utilizing each first section fastener.

In some examples, the attaching at 210 includes establishing direct physical contact between the first longeron section and the first barrel section. In some examples, the attaching at 210 includes attaching the first longeron section to the first barrel section without positioning a first shim between the first longeron section and the first barrel section. Stated another way, the attaching at 210 may include attaching the first longeron section and the first barrel section to one another without, or without a need to, shim a first interface between the first longeron section and the first barrel section.

The attaching at 210 may be performed with any suitable timing and/or sequence during methods 200. As examples, the attaching at 210 may be performed prior to the line boring at 230 and/or the attaching at 240. As additional examples, the attaching at 210 may be performed prior to, subsequent to, and/or at least partially concurrently with the attaching at 220, the assembling at 250, the attaching at 260, the positioning at 270, and/or the attaching at 280.

Attaching the landing gear fitting at 220 may include attaching the landing gear fitting to the first longeron section. Examples of the landing gear fitting are disclosed herein with reference to landing gear fitting 116. The attaching at 220 may include attaching such that the landing gear supports, or is configured to support, the landing gear assembly and/or such that the landing gear fitting permits and/or facilitates selective deployment and/or stowage of the landing gear assembly. In some examples, and as discussed, the aircraft may include a plurality of landing gear fittings, which may be distinct and/or spaced-apart from one another. In some such examples, the attaching at 220 may include attaching the plurality of landing gear fittings to corresponding locations on the first longeron section. In some examples, one or more landing gear fittings may be pre-attached to and/or integral with the first longeron section. In such examples, the one or more landing gear fittings already may be present and/or the attaching at 220 may not be utilized.

The attaching at 220 may be performed with any suitable timing and/or sequence during methods 200. As examples, the attaching at 220 may be performed subsequent to the attaching at 210, prior to the attaching at 210, at least partially concurrently with the attaching at 210, and/or prior to the line boring at 230. As additional examples, the attaching at 220 may be performed prior to, subsequent to, and/or at least partially concurrently with the attaching at 240 the assembling at 250, the attaching at 260, the positioning at 270, and/or the attaching at 280. As discussed, it may be beneficial to perform the attaching at 220 prior to the assembling at 250; however, this is not required.

It may be beneficial for the landing gear fitting to be precisely aligned with a remainder of the fuselage barrel assembly and/or with at least one other landing gear fitting of the plurality of landing gear fittings. With this in mind, and in some examples, methods 200 include line boring the landing gear fitting at 230. The line boring may be utilized to establish a precise alignment between a bore of the landing gear fitting and the remainder of the fuselage barrel assembly and/or may be utilized to establish a precise alignment among two or more bores of two or more spaced-apart landing gear fittings.

The line boring at 230 may be performed with any suitable timing and/or sequence during methods 200. As examples, the line boring at 230 may be performed subsequent to the attaching at 210, subsequent to the attaching at 220, and/or prior to the attaching at 240. As additional examples, the line boring at 230 may be performed prior to, subsequent to, and/or at least partially concurrently with the assembling at 250, the attaching at 260, the positioning at 270, and/or the attaching at 280. As discussed, it may be beneficial to perform the line boring at 230 prior to the assembling at 250; however, this is not required.

Attaching the landing gear assembly at 240 may include attaching the landing gear assembly to the landing gear fitting. The attaching at 240 may be performed with any suitable timing and/or sequence during methods 200. As examples, the attaching at 240 may be performed subsequent to the attaching at 210, subsequent to the attaching at 220, and/or subsequent to the line boring at 230. As additional examples, the attaching at 240 may be performed prior to, subsequent to, and/or at least partially concurrently with the assembling at 250, the attaching at 260, the positioning at 270, and/or the attaching at 280. As discussed, it may be beneficial to perform the attaching at 240 prior to the assembling at 250; however, this is not required.

Assembling the first barrel section and the second barrel section at 250 may include assembling the first barrel section and the second barrel section to form and/or to define a barrel joint between the first barrel section and the second barrel section. Examples of the second barrel section are disclosed herein with reference to second barrel section 40 of fuselage barrel assembly 20. Examples of the barrel joint are disclosed herein with reference to barrel joint 50.

In some examples, the assembling at 250 may include aligning a first edge of the first barrel section with a second edge of the second barrel section. Examples of the first edge are disclosed herein with reference to first edge 32. Examples of the second edge are disclosed herein with reference to second edge 42. In some such examples, the assembling at 250 further may include moving the first barrel section and/or the second barrel section. The moving may be such that the first edge and the second edge are proximate one another, such that the first edge and the second edge contact one another, and/or such that the first edge and the second edge define a barrel interface region between the first barrel section and the second barrel section.

In some examples, the first barrel section includes a first skin and a first internal frame assembly. Examples of the first skin are disclosed herein with reference to first skin 31. Examples of the first internal frame assembly are disclosed herein with reference to first internal frame assembly 38. In some such examples, the first skin may extend between an attached region of the first longeron section and the first internal frame assembly. In some such examples, a gap may separate an unattached region of the first longeron section and the first internal frame assembly. In some such examples, the assembling at 250 may include positioning a corresponding region of the second barrel section within the gap.

The assembling at 250 may be performed with any suitable timing and/or sequence during methods 200. As examples, the assembling at 250 may be performed prior to, subsequent to, and/or at least partially concurrently with the attaching at 210, the attaching at 220, the line boring at 230, the attaching at 240, the attaching at 260, the positioning at 270, and/or the attaching at 280.

Attaching the second longeron section to the second barrel section at 260 may include attaching the second longeron section to the second barrel section with, via, and/or utilizing a second plurality of section fasteners. Examples of the second longeron section are disclosed herein with reference to second longeron section 130. Examples of the second plurality of section fasteners are disclosed herein with reference to second plurality of section fasteners 132.

In some examples, the attaching at 260 may include extending each second section fastener of the second plurality of section fasteners through a corresponding second fastener hole, which extends through both the second longeron section and the second barrel section. In some such examples, the attaching at 260 includes urging a corresponding second region of the second longeron section and the second barrel section toward one another utilizing each second section fastener.

In some examples, the attaching at 260 includes establishing direct physical contact between the second longeron section and the second barrel section. In some examples, the attaching at 260 includes attaching the second longeron section to the second barrel section without positioning a second shim between the second longeron section and the second barrel section. Stated another way, the attaching at 260 may include attaching the second longeron section and the second barrel section to one another without, or without a need to, shim a second interface between the second longeron section and the second barrel section.

The attaching at 260 may be performed with any suitable timing and/or sequence during methods 200. As examples, the attaching at 260 may be performed prior to, subsequent to, and/or at least partially concurrently with the attaching at 210, the attaching at 220, the line boring at 230, the attaching at 240, the assembling at 250, the positioning at 270, and/or the attaching at 280.

Figure 10:
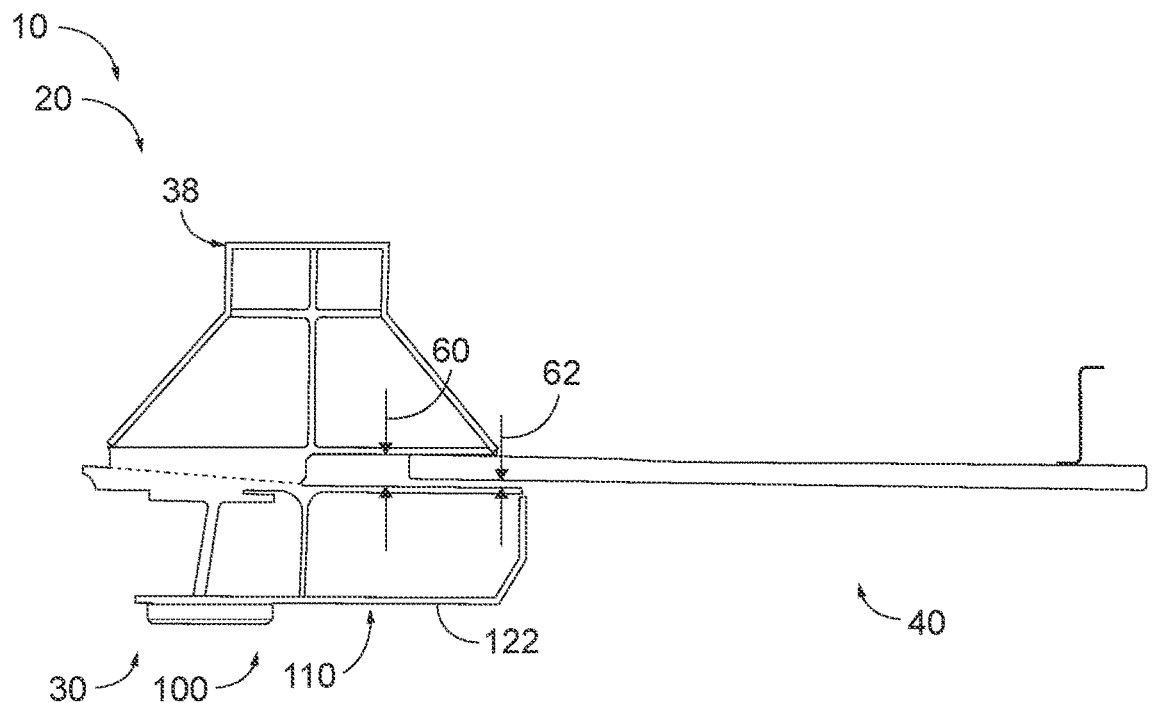
FIG. 10 is a schematic illustration of an example of a region of a fuselage barrel assembly during the methods of FIG. 6.
Figure 11:
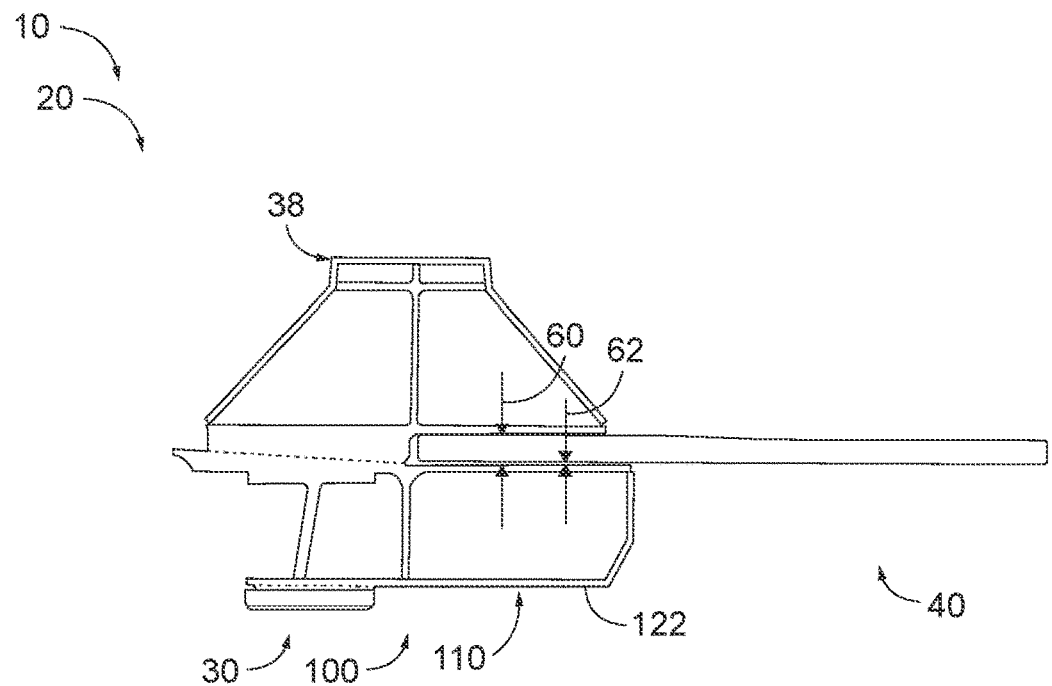
FIG. 11 is a schematic illustration of an example of a region of a fuselage barrel assembly during the methods of FIG. 6.
Figure 12:
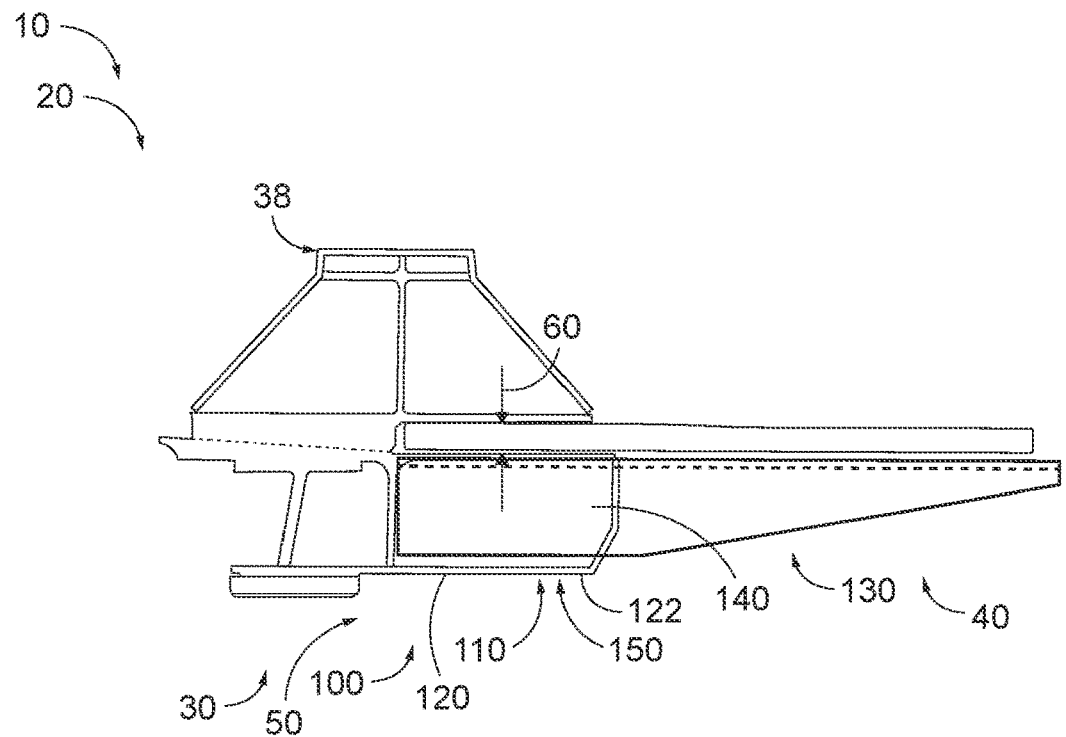
FIG. 12 is a schematic illustration of an example of a region of a fuselage barrel assembly during the methods of FIG. 6.

In a specific example, and as illustrated in FIGS. 9-12, the assembling at 250 may be performed subsequent to the attaching at 210 and prior to the attaching at 260. In some such examples, and as also illustrated in FIGS. 9-12, a gap 60 may separate an unattached region 122 of first longeron section 110 from first internal frame assembly 38 of first barrel section 30. In such examples, and as illustrated by the progression from FIG. 9 to FIG. 10 to FIG. 11, the assembling at 250 may include positioning a corresponding region of second barrel section 40 within gap 60. Subsequently, and as illustrated in FIG. 12, the attaching at 260 may be performed to attach second longeron section 130 to second barrel section 40. As illustrated, this attachment process may include insertion of a region of second longeron section 130, such as second overlap region 140, within gap 60.

Because both the corresponding region of second barrel section 40 and the region of second longeron section 130 ultimately are positioned within gap 60, gap 60 is sized to accommodate the thickness of both the corresponding region of second barrel section 40 and the thickness of the region of second longeron section 130. As such, gap 60 provides additional clearance for the corresponding region of second barrel section 40 during the assembling at 250. This clearance is illustrated in FIGS. 10-11 and indicated at 62.

Figure 16:
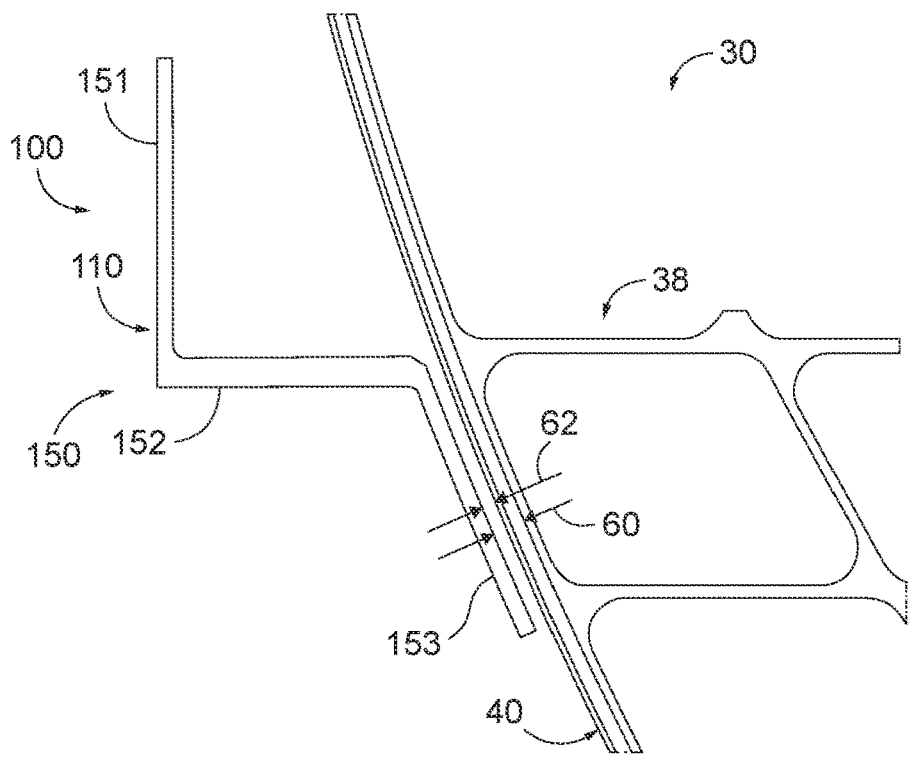
FIG. 16 is a schematic illustration of a transverse cross-sectional view of an example of a region of a fuselage barrel assembly during the methods of FIG. 6.
Figure 17:
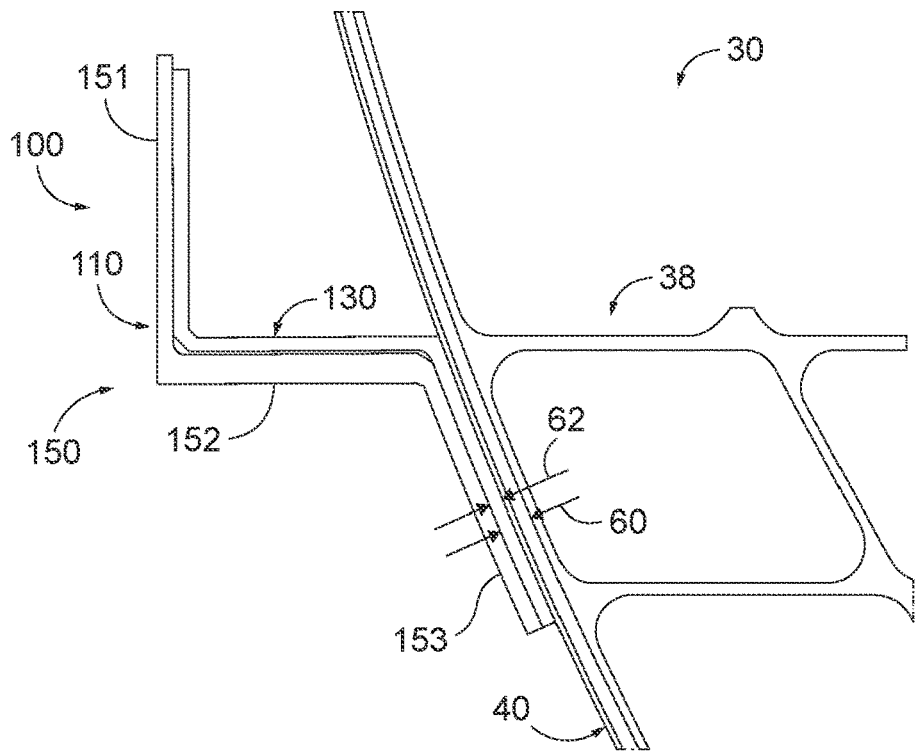
FIG. 17 is a schematic illustration of a transverse cross-sectional view of an example of a region of a fuselage barrel assembly during the methods of FIG. 6.

Gap 60 and clearance 62 also are illustrated in FIGS. 16-17, which are examples of transverse cross-sectional views of longeron joint 150. As illustrated in FIG. 16, and subsequent to the attaching at 210 and the assembling at 250 but prior to the attaching at 260, the corresponding region of second barrel section 40 may be positioned within gap 60. As illustrated, gap 60 is wider than a thickness of the corresponding region of second barrel section 40, thereby providing clearance 62, which may facilitate the assembling at 250 and/or may provide additional clearance for the corresponding region of second barrel section 40 during the assembling at 250. Subsequently, and as illustrated in FIG. 17, the attaching at 260 may be performed to attach second longeron section 130 to second barrel section 40. As illustrated, this attachment process may include insertion of a region of second longeron section 130 within gap 60.

Figure 13:
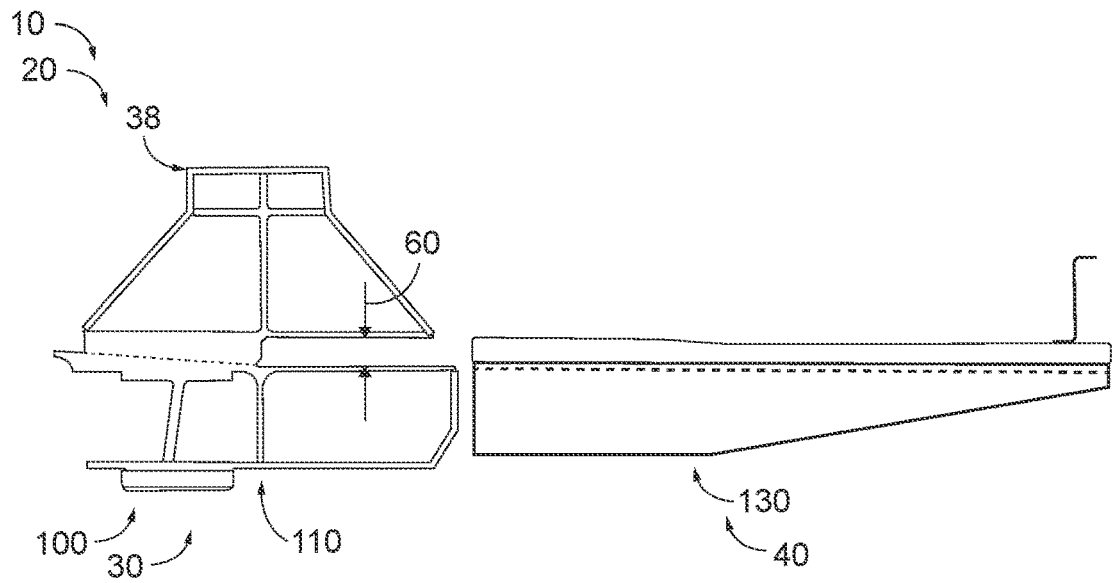
FIG. 13 is a schematic illustration of an example of a region of a fuselage barrel assembly during the methods of FIG. 6.
Figure 14:
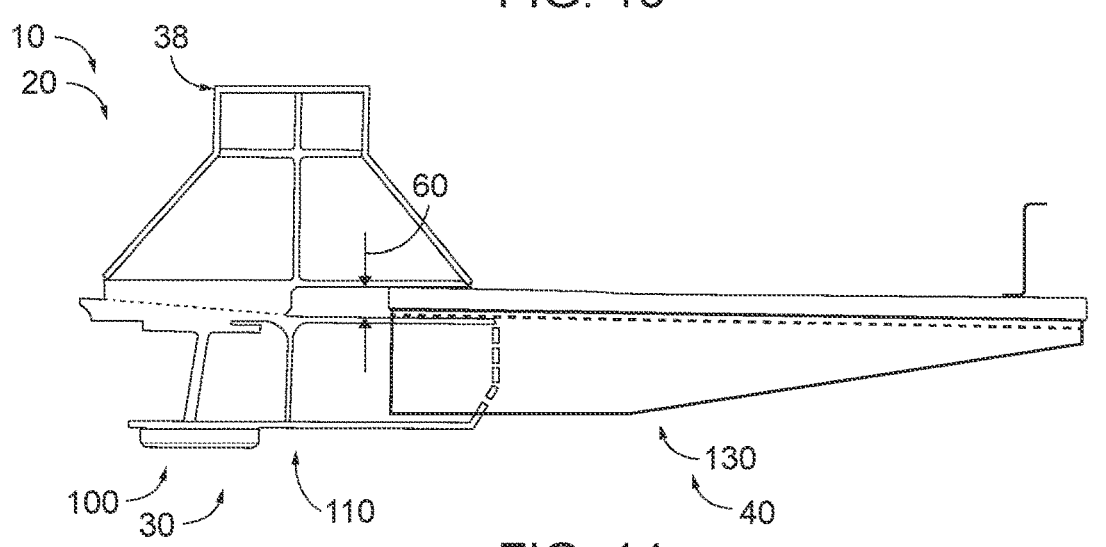
FIG. 14 is a schematic illustration of an example of a region of a fuselage barrel assembly during the methods of FIG. 6.
Figure 15:
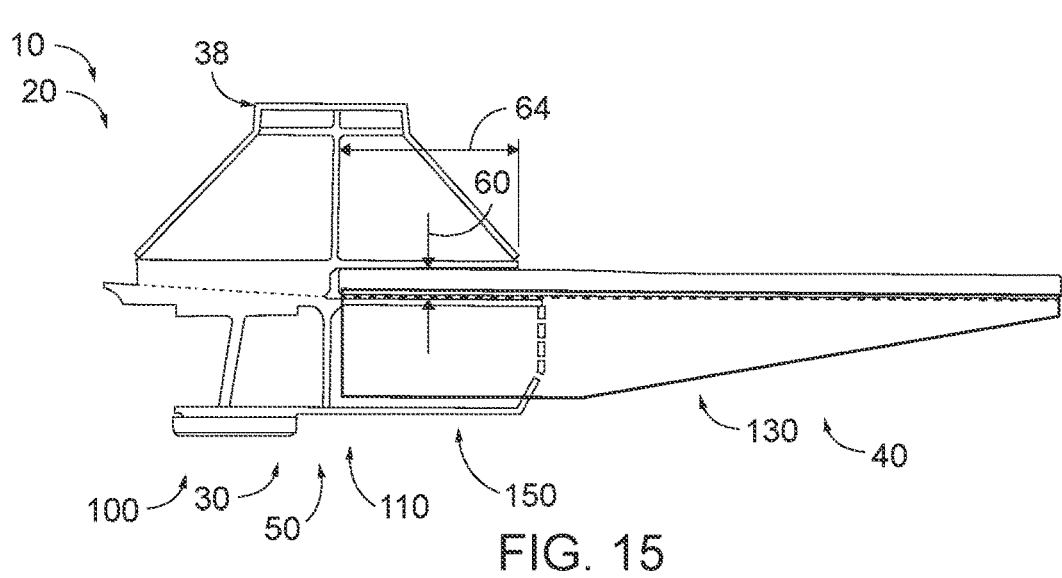
FIG. 15 is a schematic illustration of an example of a region of a fuselage barrel assembly during the methods of FIG. 6.

In another specific example, and as illustrated in FIGS. 13-15, the assembling at 250 may be performed subsequent to both the attaching at 210 and the attaching at 260. With this in mind, FIG. 13 illustrates first barrel section 30 with first longeron section 110 attached thereto and also illustrates second barrel section 40 with second longeron section 130 attached thereto. Similar to the configuration that is illustrated in FIGS. 9-12, gap 60 separates unattached region 122 of first longeron section 110 from first internal frame assembly 38 of first barrel section 30. In such examples, and as illustrated by the progression from FIG. 13 to FIG. 14 to FIG. 15, the assembling at 250 may include simultaneously positioning the corresponding region of second barrel section 40 and the region of second longeron section 130 within gap 60. In such a configuration, clearance 62 of FIGS. 9-12 may not be present, or may have a smaller magnitude when compared to the configuration of FIGS. 13-15. However, an insertion distance 64 for second barrel section 40 and second longeron section 130, within gap 60 may be relatively short. In addition, attachment of second longeron section 130 to second barrel section 40 may provide additional support for second barrel section 40, thereby facilitating the assembling at 250.

In some examples of methods 200, design and/or build tolerances of one or more components of the fuselage barrel assembly may be such that the first barrel section and the second barrel section misaligned subsequent to the assembling at 250. In addition, and as discussed, utilization of split longerons that include the first longeron section and the second longeron section, according to the present disclosure, may decrease, or even eliminate, a need to correct for this misalignment by shimming between the first longeron section and the first barrel section and/or between the second longeron section and the second barrel section.

Instead, and when this misalignment occurs, methods 200 may include positioning the joint shim at 270. The positioning at 270 may include positioning the joint shim between the first longeron section and the second longeron section, such as to permit and/or facilitate adjustment of the relative orientation between the first barrel section and the second barrel section and/or alignment of the first barrel section and the second barrel section to one another.

The positioning at 270 may be performed with any suitable timing and/or sequence during methods 200. As examples, the positioning at 270 may be performed subsequent to the attaching at 210, subsequent to the assembling at 250, subsequent to the attaching at 260, and/or prior to the attaching at 280. As additional examples, the positioning at 270 may be performed prior to, subsequent to, and/or at least partially concurrently with the attaching at 220, the line boring at 230, and/or the attaching at 240.

Attaching the first longeron section to the second longeron section at 280 may include attaching the first longeron section to the second longeron section with, via, and/or utilizing a plurality of joint fasteners. Examples of the plurality of joint fasteners are disclosed herein with reference to the plurality of joint fasteners 160.

In some examples, the attaching at 280 may include extending each joint fastener of the plurality of joint fasteners through a corresponding joint fastener hole, which extends through both the first longeron section and the second longeron section. In some such examples, the attaching at 280 includes urging a corresponding first region of the first longeron section and a second region of the second longeron section toward one another utilizing each joint section fastener.

The attaching at 280 may be performed with any suitable timing and/or sequence during methods 200. As examples, the attaching at 280 may be performed prior to, subsequent to, or at least partially concurrently with the attaching at 210, the attaching at 220, the line boring at 230, the attaching at 240, the assembling at 250, and/or the attaching at 260. As another example, the attaching at 280 may be performed subsequent to the positioning at 270.

Illustrative, non-exclusive examples of inventive subject matter according to the present disclosure are described in the following enumerated paragraphs:

A1. A fuselage barrel assembly (20) for an aircraft (10), the fuselage barrel assembly (20) comprising:
a first barrel section (30);
a second barrel section (40) interfaced with the first barrel section (30) to define a barrel joint (50) between the first barrel section (30) and the second barrel section (40); and
a split longeron (100) that extends across the barrel joint (50) and is attached to both the first barrel section (30) and the second barrel section (40), the split longeron (100) including:
(i) a first longeron section (110) that is attached to the first barrel section (30), optionally via a first plurality of section fasteners (112);
(ii) a second longeron section (130) that is attached to the second barrel section (40), optionally via a second plurality of section fasteners (132); and
(iii) a longeron joint (150) that attaches the first longeron section (110) to the second longeron section (130) via a plurality of joint fasteners (160).

A2. The fuselage barrel assembly (20) of paragraph A1, wherein the first longeron section (110) is forward of the second longeron section (130).

A3. The fuselage barrel assembly (20) of any of paragraphs A1-A2, wherein the first longeron section (110) includes a first barrel-contacting region (114), a planar first barrel-contacting region (114), or at an at least substantially planar first barrel-contacting region (114) that interfaces with the first barrel section (30).

A4. The fuselage barrel assembly (20) of any of paragraphs A1-A3, wherein the first longeron section (110) further includes a landing gear fitting (116) configured to at least partially support a landing gear assembly (118) of the aircraft (10).

A5. The fuselage barrel assembly (20) of paragraph A4, wherein the fuselage barrel assembly (20) further includes the landing gear assembly (118), wherein the landing gear assembly (118) is attached to the first longeron section (110) via the landing gear fitting (116).

A6. The fuselage barrel assembly (20) of any of paragraphs A1-A5, wherein the first longeron section (110) at least one of:
(i) at least partially defines a landing gear bay (34) of the aircraft (10); and
(ii) at least partially bounds the landing gear bay (34) of the aircraft (10).

A7. The fuselage barrel assembly (20) of any of paragraphs A1-A6, wherein the second longeron section (130) is aft of the first longeron section (110).

A8. The fuselage barrel assembly (20) of any of paragraphs A1-A7, wherein the second longeron section (130) includes a second barrel-contacting region (134) or a non-planar second barrel-contacting region (134) that interfaces with the second barrel section (40).

A9. The fuselage barrel assembly (20) of any of paragraphs A1-A8, wherein the longeron joint (150) at least one of:
(i) includes a lap joint;
(ii) is the lap joint; and
(iii) defines an overlap region (156) between the first longeron section (110) and the second longeron section (130).

A10. The fuselage barrel assembly (20) of any of paragraphs A1-A9, wherein the first longeron section (110) includes a first overlap region (120), wherein the second longeron section (130) includes a second overlap region (140), and further wherein the first overlap region (120) and the second overlap region (140)

overlap with one another, along a longitudinal length of the split longeron (100), to define the longeron joint (150).

A11. The fuselage barrel assembly (20) of any of paragraphs A1-A10, wherein the longeron joint (150) includes a first joint region (151), a second joint region (152), and a third joint region (153), and further wherein the first longeron section (110) and the second longeron section (130) overlap with one another within the first joint region (151), within the second joint region (152), and within the third joint region (153).

A12. The fuselage barrel assembly (20) of paragraph A11, wherein the first joint region (151), the second joint region (152), and the third joint region (153) are oriented at skew angles relative to one another.

A13. The fuselage barrel assembly (20) of any of paragraphs A11-A12, wherein at least one of:
(i) the first joint region (151) is a first planar, or at least substantially planar, joint region (151);
(ii) the second joint region (152) is a second planar, or at least substantially planar, joint region (152); and
(iii) the third joint region (153) is a third planar, or at least substantially planar, joint region (153).

A14. The fuselage barrel assembly (20) of any of paragraphs A11-A13, wherein the first joint region (151), the second joint region (152), and the third joint region (153) together define a Z-shaped splice between the first longeron section (110) and the second longeron section (130).

A15. The fuselage barrel assembly (20) of any of paragraphs A1-A14, wherein a transverse cross-section of the fuselage barrel assembly (20), which extends at least partially through the barrel joint (50), at least one of:
(i) extends within at least a region of the longeron joint (150); and
(ii) is within a threshold distance of the longeron joint (150), optionally wherein the threshold distance is one of at most 0.01 meter (m), at most 0.05 m, at most 0.1 m, at most 0.2 m, at most 0.3 m, at most 0.4 m, and at most 0.5 m.

A16. The fuselage barrel assembly (20) of any of paragraphs A1-A15, wherein the split longeron (100) further includes a joint shim (170) positioned within the longeron joint (150) and compressed between the first longeron section (110) and the second longeron section (130).

A17. The fuselage barrel assembly (20) of any of paragraphs A1-A16, wherein the first barrel section (30) is forward of the second barrel section (40).

A18. The fuselage barrel assembly (20) of any of paragraphs A1-A17, wherein the first barrel section (30) at least partially bounds a/the landing gear bay (34) of the aircraft (10).

A19. The fuselage barrel assembly (20) of any of paragraphs A1-A18, wherein the first barrel section (30) is attached to at least a region of a wing (12) of the aircraft (10).

A20. The fuselage barrel assembly (20) of any of paragraphs A1-A19, wherein the first barrel section (30) includes a first longeron-contacting region (36), a planar first longeron-contacting region (36), or an at least substantially planar first longeron-contacting region (36) that interfaces with the first longeron section (110).

A21. The fuselage barrel assembly (20) of any of paragraphs A1-A20, wherein the second barrel section (40) is aft of the first barrel section (30).

A22. The fuselage barrel assembly (20) of any of paragraphs A1-A21, wherein the second barrel section (40) includes a second longeron-contacting region (46) or a non-planar second longeron-contacting region (46) that interfaces with the second longeron section (130).

A23. The fuselage barrel assembly (20) of any of paragraphs A1-A22, wherein the first plurality of section fasteners (112) at least one of:
(i) is spaced-apart from the second barrel section (40);
(ii) is spaced-apart from the second longeron section (130); and
(iii) is spaced-apart from the second plurality of section fasteners (132).

A24. The fuselage barrel assembly (20) of any of paragraphs A1-A23, wherein the second plurality of section fasteners (132) at least one of:
(i) is spaced-apart from the first barrel section (30);
(ii) is spaced-apart from the first longeron section (110); and
(iii) is spaced-apart from the first plurality of section fasteners (112).

A25. The fuselage barrel assembly (20) of any of paragraphs A1-A24, wherein at least one of:
(i) a first subset (161) of the plurality of joint fasteners (160) is spaced-apart from the first barrel section (30);
(ii) a second subset (162) of the plurality of joint fasteners (160) is spaced-apart from the second barrel section (40);
(iii) a third subset (163) of the plurality of joint fasteners (160) attaches the split longeron (100) to the first barrel section (30); and
(iv) a fourth subset (164) of the plurality of joint fasteners (160) attaches the split longeron (100) to the second barrel section (40).

A26. The fuselage barrel assembly (20) of any of paragraphs A1-A25, wherein the split longeron (100) is a first split longeron (101) and is positioned on a first side (21) of the fuselage barrel assembly (20), and further wherein the fuselage barrel assembly (20) includes a second split longeron (102) positioned on an opposed second side (22) of the fuselage barrel assembly (20).

A27. The fuselage barrel assembly (20) of any of paragraphs A1-A26, wherein at least one of:
(i) the fuselage barrel assembly (20) is free of a first shim that extends between the first longeron section (110) and the first barrel section (30);
(ii) the first longeron section (110) is in direct physical contact with the first barrel section (30);
(iii) the fuselage barrel assembly (20) is free of a second shim that extends between the second longeron section (130) and the second barrel section (40); and
(iv) the second longeron section (130) is in direct physical contact with the second barrel section (40).

B1. A method (200) of assembling a fuselage barrel assembly (20) of an aircraft (10), the method (200) comprising:
attaching (210) a first longeron section (110) to a first barrel section (30) of the fuselage barrel assembly (20) utilizing a first plurality of section fasteners (112);
assembling (250) the first barrel section (30) and a second barrel section (40) to define a barrel joint (50) between the first barrel section (30) and the second barrel section (40);
attaching (260) a second longeron section (130) to the second barrel section (40) utilizing a second plurality of section fasteners (132); and attaching (280) the first longeron section (110) to the second longeron section (130) utilizing a plurality of joint fasteners (160).

B2. The method (200) of paragraph B1, wherein, prior to the assembling (250) the first barrel section (30) and the second barrel section (40), the method (200) further includes attaching (220) a landing gear fitting (116) to the first longeron section (110).

B3. The method (200) of paragraph B2, wherein, subsequent to the attaching (220) the landing gear fitting (116) to the first longeron section (110), the method (200) further includes line boring (230) the landing gear fitting (116), optionally wherein the line boring (230) is performed prior to the assembling (250) the first barrel section (30) and the second barrel section (40).

B4. The method (200) of any of paragraphs B2-B3, wherein, subsequent to the attaching (220) the landing gear fitting (116) to the first longeron section (110), the method (200) further includes attaching (240) a landing gear assembly (118) to the landing gear fitting (116), optionally wherein the attaching (240) the landing gear assembly (118) is performed prior to the assembling (250) the first barrel section (30) and the second barrel section (40), and further optionally wherein the attaching (240) the landing gear assembly (118) is performed subsequent to a/the line boring (230) the landing gear fitting (116).

B5. The method (200) of any of paragraphs B1-B4, wherein the attaching (210) the first longeron section (110) to the first barrel section (30) is performed prior to the assembling (250) the first barrel section (30) and the second barrel section (40).

B6. The method (200) of any of paragraphs B1-B5, wherein the attaching (210) the first longeron section (110) to the first barrel section (30) includes extending each first section fastener of the first plurality of section fasteners (112) through a corresponding first fastener hole, which extends through both the first longeron section (110) and the first barrel section (30), and subsequently urging a corresponding first region of the first longeron section (110) and the first barrel section (30) toward one another utilizing the each first section fastener.

B7. The method (200) of any of paragraphs B1-B6, wherein the attaching (210) the first longeron section (110) to the first barrel section (30) includes at least one of:
(i) establishing direct physical contact between the first longeron section (110) and the first barrel section (30); and
(ii) attaching without positioning a first shim between the first longeron section (110) and the first barrel section (30).

B8. The method (200) of any of paragraphs B1-B7, wherein the assembling (250) the first barrel section (30) and the second barrel section (40) is one of:
(i) prior to the attaching (260) the second longeron section (130) to the second barrel section (40); and
(ii) subsequent to the attaching (260) the second longeron section (130) to the second barrel section (40).

B9. The method (200) of any of paragraphs B1-B8, wherein the assembling (250) the first barrel section (30) and the second barrel section (40) includes aligning a first edge (32) of the first barrel section (30) with a second edge (42) of the second barrel section (40) and moving at least one of the first barrel section (30) and the second barrel section (40) at least one of:
(i) such that the first edge (32) and the second edge (42) are proximate one another;
(ii) such that the first edge (32) and the second edge (42) contact one another; and
(iii) such that the first edge (32) and the second edge (42) define a barrel interface region between the first barrel section (30) and the second barrel section (40).

B10. The method (200) of any of paragraphs B1-B9, wherein the first barrel section (30) includes a first skin (31) and a first internal frame assembly (38), wherein the first skin (31) extends between an attached region of the first longeron section (110) and the first internal frame assembly (38), wherein a gap (60) separates an unattached region (122) of the first longeron section (110) and the first internal frame assembly (38), and further wherein the assembling (250) the first barrel section (30) and the second barrel section (40) includes positioning a corresponding region of the second barrel section (40) within the gap (60).

B11. The method (200) of paragraph B10, wherein the attaching (260) the second longeron section (130) to the second barrel section (40) includes positioning a corresponding region of the second longeron section (130) within the gap (60).

B12. The method (200) of any of paragraphs B1-B11, wherein the attaching (260) the second longeron section (130) to the second barrel section (40) includes extending each second section fastener of the second plurality of section fasteners (132) through a corresponding second fastener hole, which extends through both the second longeron section (130) and the second barrel section (40), and subsequently urging a corresponding second region of the second longeron section (130) and the second barrel section (40) toward one another utilizing the each second section fastener.

B13. The method (200) of any of paragraphs B1-B12, wherein the attaching (260) the second longeron section (130) to the second barrel section (40) includes at least one of:
(i) establishing direct physical contact between the second longeron section (130) and the second barrel section (40); and
(ii) attaching without positioning a second shim between the second longeron section (130) and the second barrel section (40).

B14. The method (200) of any of paragraphs B1-B13, wherein the attaching (280) the first longeron section (110) to the second longeron section (130) is performed subsequent to the assembling (250) the first barrel section (30) and the second barrel section (40).

B15. The method (200) of any of paragraphs B1-B14, wherein the attaching (280) the first longeron section (110) to the second longeron section (130) includes extending each joint fastener of the plurality of joint fasteners (160) through a corresponding joint fastener hole, which extends through both the first longeron section (110) and the second longeron section (130), and subsequently urging a corresponding first region of the first longeron section (110) and a second region of the second longeron section (130) toward one another utilizing the each joint section fastener.

B16. The method (200) of any of paragraphs B1-B15, wherein, prior to the attaching (280) the first longeron section (110) to the second longeron section (130), the method (200) further includes positioning (270) a joint shim (170) between the first longeron section (110) and the second longeron section (130), and optionally wherein the attaching (280) the first longeron section (110) to the second longeron section (130) includes compressing the joint shim (170) between the first longeron section (110) and the second longeron section (130).

B17. The method (200) of any of paragraphs B1-B16, wherein the fuselage barrel assembly (20) includes any suitable structure of any of the fuselage barrel assemblies of any of paragraphs A1-A27.

C1. The use of a split longeron (100) to operatively support an interface between a first barrel section (30) and a second barrel section (40) within a fuselage barrel assembly (20) of an aircraft (10).

C2. The use of any of the fuselage barrel assemblies of any of paragraphs A1-A27 with any of the methods (200) of any of paragraphs B1-B17.

C3. The use of any of the methods (200) of any of paragraphs B1-B17 with any of the fuselage barrel assemblies of any of paragraphs A1-A27.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A fuselage barrel assembly for an aircraft, the fuselage barrel assembly comprising:
   a first barrel section;
   a second barrel section interfaced with the first barrel section to define a barrel joint between the first barrel section and the second barrel section; and
   a split longeron that extends across the barrel joint and is attached to both the first barrel section and the second barrel section, the split longeron including:
   (i) a first longeron section that is attached to the first barrel section via a first plurality of section fasteners;

(ii) a second longeron section that is attached to the second barrel section via a second plurality of section fasteners; and (iii) a longeron joint that attaches the first longeron section to the second longeron section via a plurality of joint fasteners;

wherein the longeron joint includes a first joint region, a second joint region, and a third joint region;

wherein the first longeron section and the second longeron section overlap with one another within the first joint region, within the second joint region, and within the third joint region;

wherein a corresponding subset of the plurality of joint fasteners operatively attaches the first longeron section to the second longeron section within each of the first joint region and the second joint region;

wherein the plurality of joint fasteners is spaced-apart from the first barrel section and also from the second barrel section; and further wherein the first joint region, the second joint region, and the third joint region are oriented at angles relative to one another when viewed within a transverse cross-section of the barrel joint.

2. The fuselage barrel assembly of claim 1, wherein the first longeron section includes a first barrel-contacting region that interfaces with the first barrel section.

3. The fuselage barrel assembly of claim 1, wherein:
(i) the first longeron section further includes a landing gear fitting configured to at least partially support a landing gear assembly of the aircraft; and
(ii) the second longeron section includes a second barrel-contacting region that interfaces with the second barrel section.

4. The fuselage barrel assembly of claim 1, wherein the longeron joint at least one of:
(i) includes a lap joint;
(ii) is the lap joint; and
(iii) defines an overlap region between the first longeron section and the second longeron section.

5. The fuselage barrel assembly of claim 1, wherein the first joint region, the second joint region, and the third joint region together define a Z-shaped splice between the first longeron section and the second longeron section when viewed within the transverse cross-section of the barrel joint.

6. The fuselage barrel assembly of claim 1, wherein a transverse cross-section of the fuselage barrel assembly that extends at least partially through the barrel joint is within a threshold distance of the longeron joint, wherein the threshold distance is at most 0.1 meter.

7. The fuselage barrel assembly of claim 1, wherein the split longeron further includes a joint shim positioned within the longeron joint and compressed between the first longeron section and the second longeron section.

8. The fuselage barrel assembly of claim 1, wherein:
(i) the first barrel section includes a first longeron-contacting region that interfaces with the first longeron section; and
(ii) the second barrel section includes a second longeron-contacting region that interfaces with the second longeron section.

9. The fuselage barrel assembly of claim 1, wherein the split longeron is a first split longeron and is positioned on a first side of the fuselage barrel assembly, and further wherein the fuselage barrel assembly includes a second split longeron positioned on an opposed second side of the fuselage barrel assembly, wherein the first split longeron and the second split longeron both are external the fuselage barrel assembly.

10. A method of assembling a fuselage barrel assembly of an aircraft, the method comprising:
attaching a first longeron section to a first barrel section of the fuselage barrel assembly utilizing a first plurality of section fasteners;
assembling the first barrel section and a second barrel section to define a barrel joint between the first barrel section and the second barrel section;
attaching a second longeron section to the second barrel section utilizing a second plurality of section fasteners; and
attaching the first longeron section to the second longeron section utilizing a plurality of joint fasteners;
wherein the first barrel section includes a first skin and a first internal frame assembly;
wherein the first skin extends between an attached region of the first longeron section and the first internal frame assembly;
wherein a gap separates an unattached region of the first longeron section and the first internal frame assembly;
wherein the assembling the first barrel section and the second barrel section includes positioning a corresponding region of the second barrel section within the gap;
wherein the attaching the second longeron section to the second barrel section includes positioning a corresponding region of the second longeron section within the gap; and
further wherein, subsequent to the assembling, the first internal frame assembly is internal the fuselage barrel assembly and the first longeron section and the second longeron section both are external the fuselage barrel assembly.

11. The method of claim 10, wherein, prior to the assembling the first barrel section and the second barrel section, the method further includes attaching a landing gear fitting to the first longeron section.

12. The method of claim 11, wherein, subsequent to the attaching the landing gear fitting to the first longeron section, the method further includes line boring the landing gear fitting, wherein the line boring is performed prior to the assembling the first barrel section and the second barrel section.

13. The method of claim 10, wherein the attaching the first longeron section to the first barrel section is performed prior to the assembling the first barrel section and the second barrel section.

14. The method of claim 10, wherein at least one of:
(i) the attaching the first longeron section to the first barrel section includes establishing direct physical contact between the first longeron section and the first barrel section; and
(ii) the attaching the second longeron section to the second barrel section includes establishing direct physical contact between the second longeron section and the second barrel section.

15. The method of claim 10, wherein the assembling the first barrel section and the second barrel section is performed prior to the attaching the second longeron section to the second barrel section.

16. The method of claim 10, wherein the attaching the first longeron section to the second longeron section is performed subsequent to the assembling the first barrel section and the second barrel section.

17. The method of claim 10, wherein, prior to the attaching the first longeron section to the second longeron section, the method further includes positioning a joint shim between the first longeron section and the second longeron section.

18. The method of claim 10, wherein:
   a longeron joint that attaches the first longeron section to the second longeron section via the plurality of joint fasteners includes a first joint region, a second joint region, and a third joint region;
   the first longeron section and the second longeron section overlap with one another within the first joint region, within the second joint region, and within the third joint region; and
   the first joint region, the second joint region, and the third joint region are oriented at angles relative to one another when viewed within a transverse cross-section of the barrel joint.

19. The method of claim 10, wherein:
   a longeron joint that attaches the first longeron section to the second longeron section via the plurality of joint fasteners includes a first joint region, a second joint region, and a third joint region; and
   the first joint region, the second joint region, and the third joint region together define a Z-shaped splice between the first longeron section and the second longeron section when viewed within a transverse cross-section of the barrel joint.

20. A method of assembling a fuselage barrel assembly of an aircraft, the method comprising:
   attaching a first longeron section to a first barrel section of the fuselage barrel assembly utilizing a first plurality of section fasteners;
   assembling the first barrel section and a second barrel section to define a barrel joint between the first barrel section and the second barrel section;
   attaching a second longeron section to the second barrel section utilizing a second plurality of section fasteners; and
   attaching the first longeron section to the second longeron section utilizing a plurality of joint fasteners;
   wherein the assembling the first barrel section and the second barrel section is performed prior to the attaching the second longeron section to the second barrel section;
   further wherein, subsequent to the assembling, the first longeron section and the second longeron section both are external the fuselage barrel assembly; and
   wherein a longeron joint that attaches the first longeron section to the second longeron section via the plurality of joint fasteners includes a first joint region, a second joint region, and a third joint region;
   the first longeron section and the second longeron section overlap with one another within the first joint region, within the second joint region, and within the third joint region; and
   the first joint region, the second joint region, and the third joint region are oriented at angles relative to one another when viewed within a transverse cross-section of the barrel joint.

\* \* \* \* \*